United States Patent [19]

Negishi

[11] Patent Number: 5,080,020
[45] Date of Patent: Jan. 14, 1992

[54] TRAVELING DEVICE HAVING ELASTIC CONTRACTIBLE BODY MOVING ALONG ELONGATED MEMBER

[75] Inventor: Koichi Negishi, Kodaira, Japan

[73] Assignee: Nihon Kohden Corporation, Tokyo, Japan

[21] Appl. No.: 552,028

[22] Filed: Jul. 13, 1990

[30] Foreign Application Priority Data

Jul. 14, 1989 [JP] Japan .................. 1-180596
Aug. 30, 1989 [JP] Japan .................. 1-221644

[51] Int. Cl.$^5$ .................................. B61B 13/10
[52] U.S. Cl. ........................... 104/138.2; 105/365
[58] Field of Search .............. 104/138.1, 138.2; 105/365; 254/134.6

[56] References Cited

U.S. PATENT DOCUMENTS 3,224,734 10/1963 Hill ......................... 254/134.6
4,372,161 2/1983 de Buda et al. ............ 254/134.6 X
4,403,551 9/1983 Slight ........................ 104/138.2
4,522,129 6/1985 Jerberyd ................... 104/138.2 X

FOREIGN PATENT DOCUMENTS 63-91555 4/1988 Japan.
1186462 7/1989 Japan .................... 104/138.1

Primary Examiner—Robert J. Oberleitner
Assistant Examiner—Lee W. Young
Attorney, Agent, or Firm—Sughrue, Mion, Zinn Macpeak & Seas

[57] ABSTRACT

A traveling device moving along an elongated member includes support members arranged spaced apart from each other, an elastic contractible body arranged between the support members and expansible radially outwardly to cause contracting force in axial directions, an elastic member causing a force against the contracting force of the elastic contractible body, anchoring devices provided on the support members, respectively, and expansible to engage the elongated member when being supplied with a pressurized fluid, and a plurality of control cables each extending through one of the support members and connected with one end to the other support member. The traveling device can move along straight and curved portions of the elongated member by supplying and exhausting the pressurized fluid into and from the elastic contractible body and operating the control cables in response to alternate supply and exhaust of the pressurized fluid into and from the anchoring devices.

15 Claims, 13 Drawing Sheets

FIG._2

FIG_4a
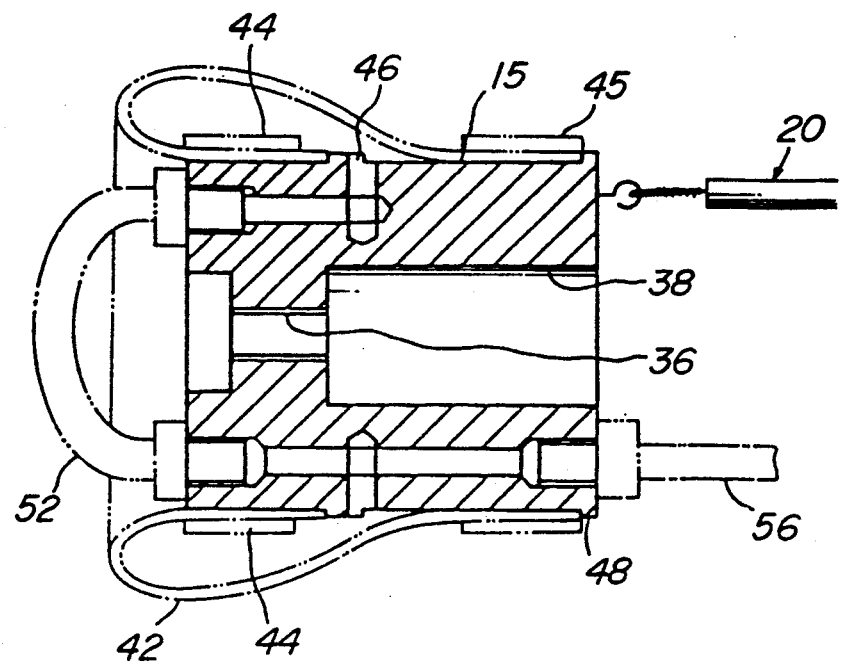
FIG_4b
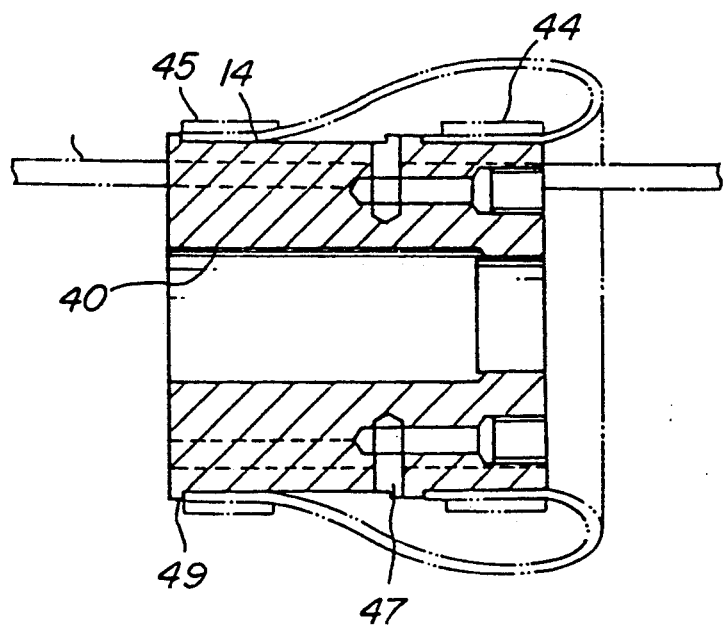

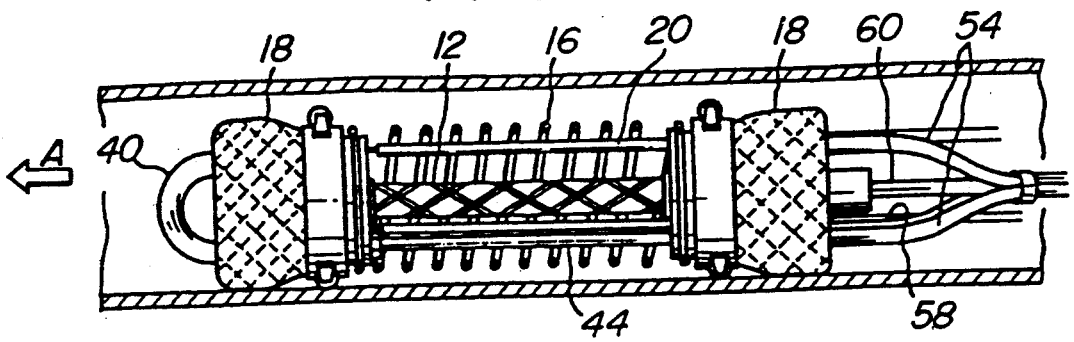
FIG_5a
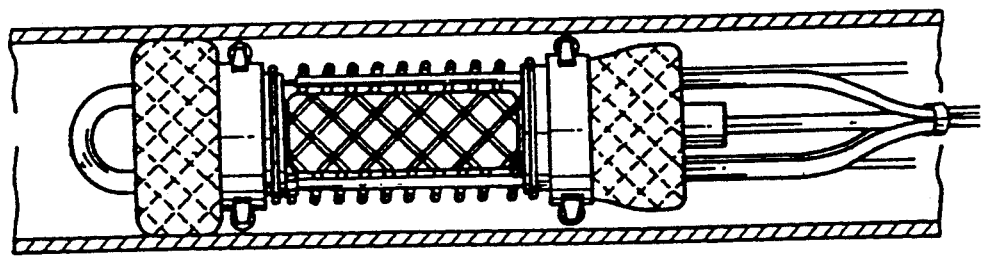
FIG_5b
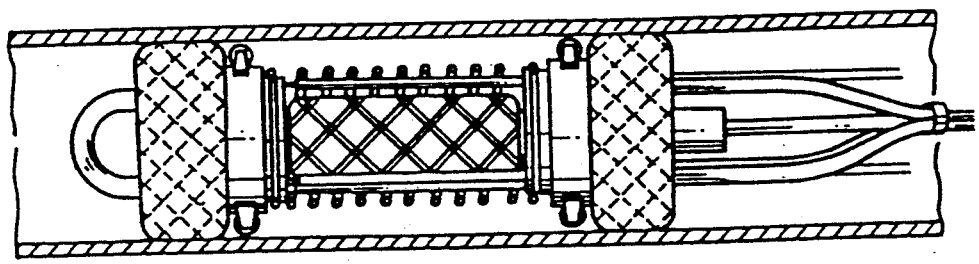
FIG_5c
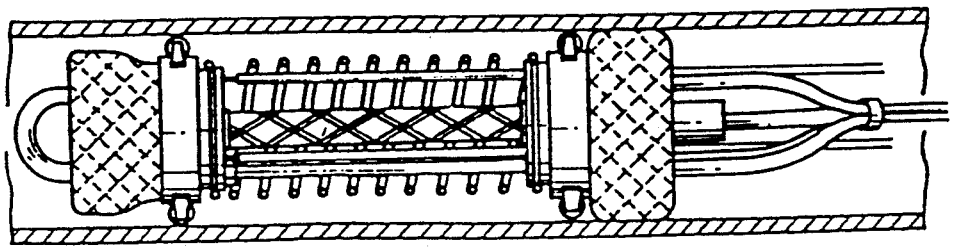
FIG_5d

FIG_6a
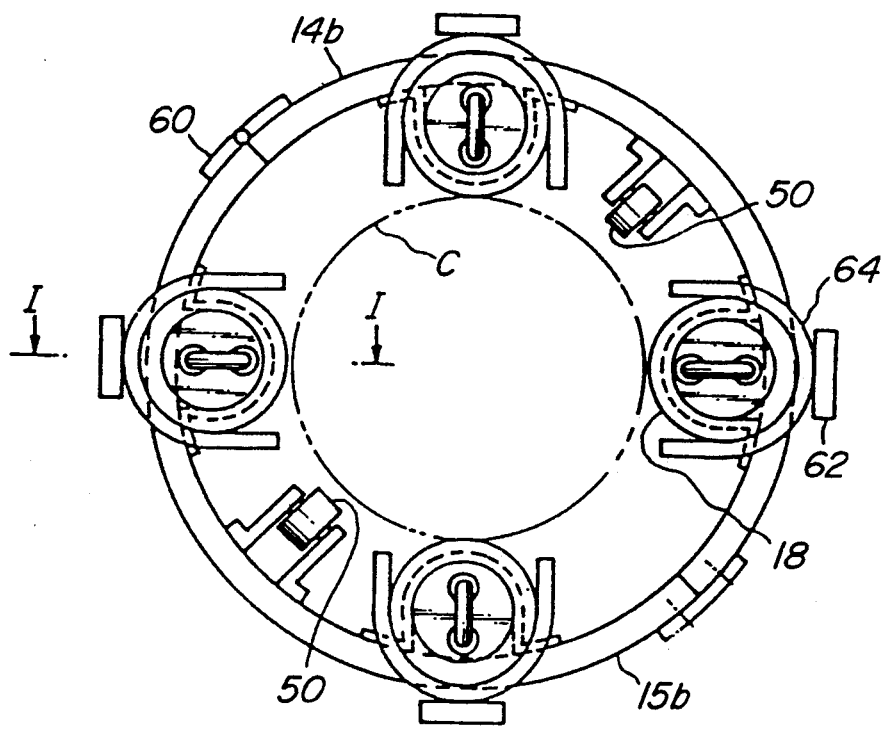
FIG_6b
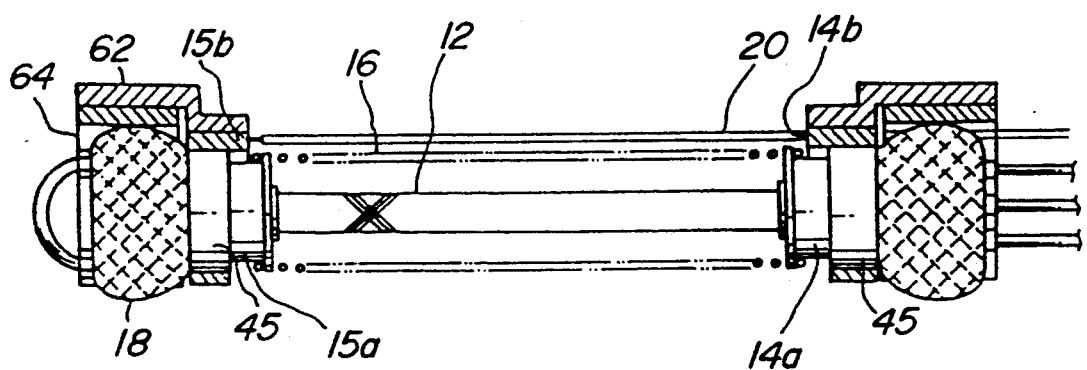

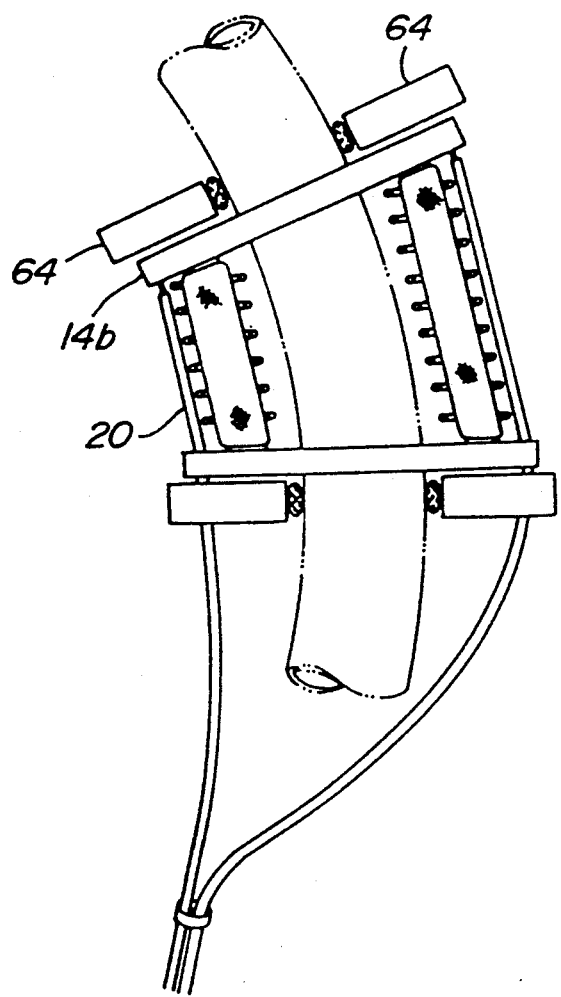
FIG_7

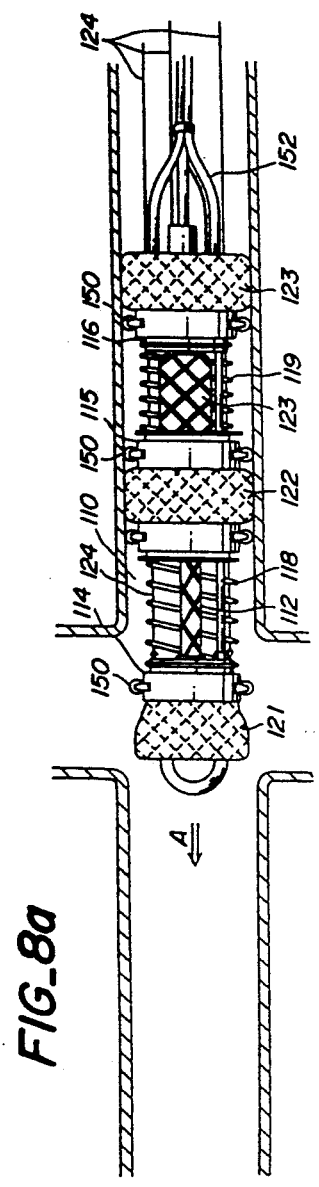
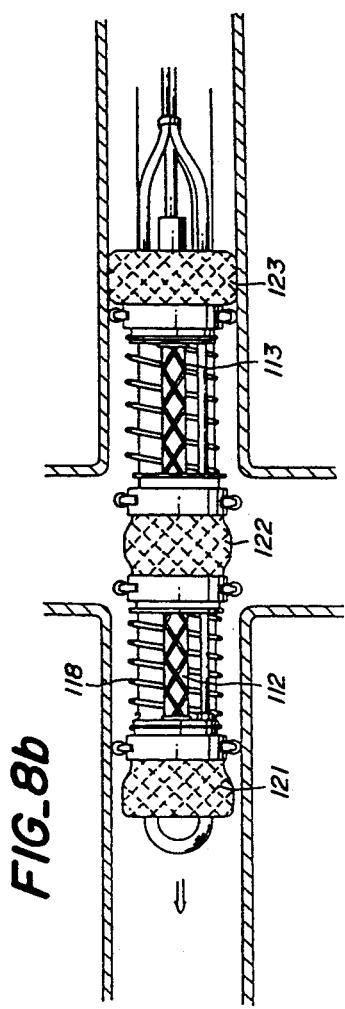
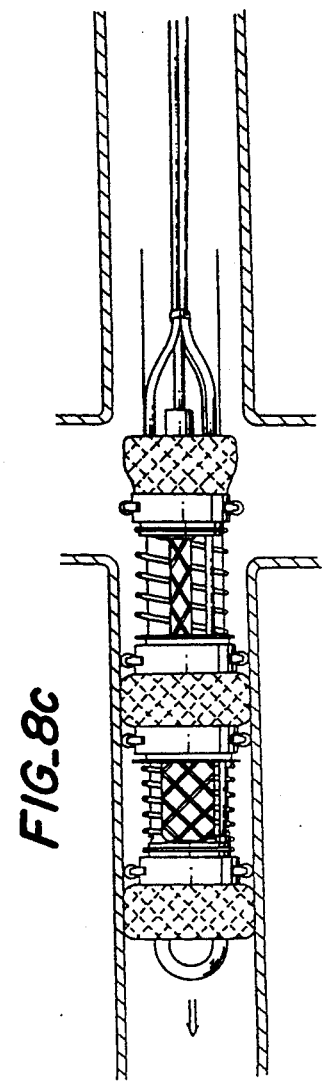
FIG_8a  FIG_8b  FIG_8c

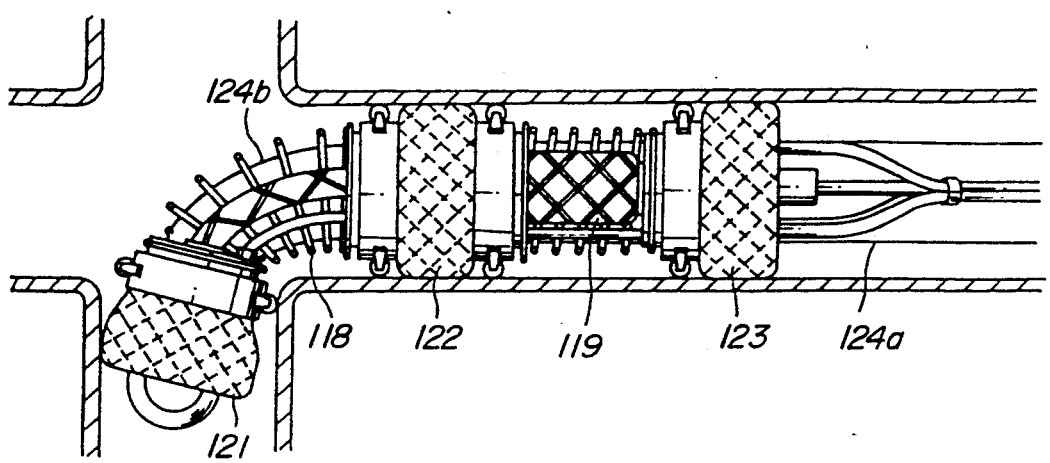
FIG_10a

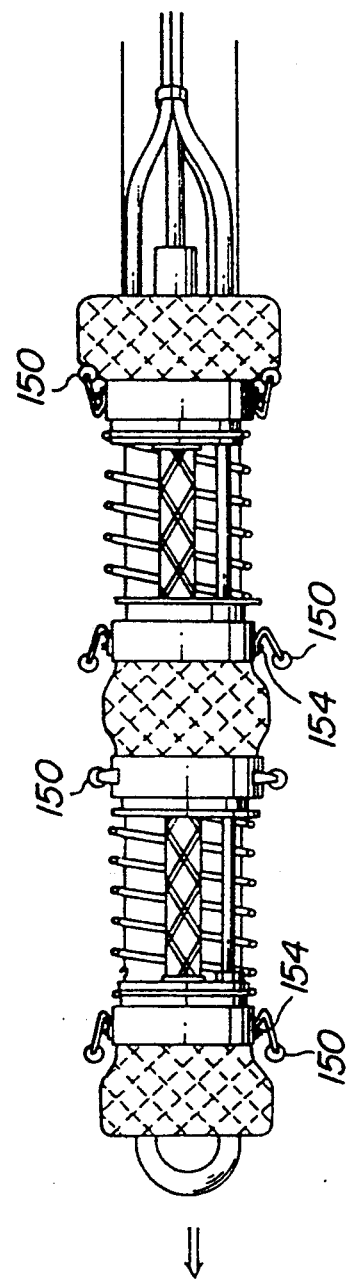

TRAVELING DEVICE HAVING ELASTIC CONTRACTIBLE BODY MOVING ALONG ELONGATED MEMBER

BACKGROUND OF THE INVENTION

This invention relates to a traveling device movable along a straight or a curved elongated member by alternately supplying and exhausting a pressurized fluid into and from the elastic member which expands radially outwardly and contracts in axial directions when being supplied with the pressurized fluid.

In chemical plants, nuclear power stations and the like, there are a great many pipe lines effectively connected for chemical reaction, energy conversion processes and the like. In order to operate these plants safely and effectively, it is necessary to maintain and inspect the inside and outside of these pipe lines periodically.

However, it is sometimes impossible for an operator to directly inspect the inside of the pipe lines due to their small diameters and external conditions.

In such a case, damage of the pipe lines and existence or amount of substances accumulated in the pipe lines have been inspected by a traveling device having wheels or pawls and driven by an electric or hydraulic motor, which was provided with monitor means such as small type television camera or fiber scope.

With such a hitherto used traveling device, as the electric or hydraulic motor is used as driving means, the traveling device is heavy and bulky so that an applicable range is limited. In addition, as the weight of the main body of the traveling device is heavy in comparison with the driving power, the traveling area is limited to horizontal portions or slightly inclined or curved portions of pipe lines. Moreover as the traveling device itself is rigid in construction, it is difficult to move along curved portions of the pipe lines.

Furthermore, the electric or hydraulic motor as driving means tends to cause sparks and heating in operation so that the use of such a motor is limited in chemical plants including petroleum refineries treating inflammable or explosive materials.

A traveling device having an elastic contractible body as shown in FIG. 1 has been proposed in Japanese Patent Application Laid-open No. 63-91,555. This device includes support members 4 supporting both ends of the elastic contractible body, and anchoring means 6 arranged on the support members 4 and adapted to be alternately expanded by supplying and exhausting a pressurized fluid into and from the elastic contractible body 2 so that the anchoring means are brought into engagement with an inner circumferential surface of a pipe to perform advancing or retracting movement of the traveling device. This traveling device uses an elastic contractible body of the air-bag type as an actuator. Therefore, the traveling device is small and light weight and superior in explosion-proofness and has other various advantages as a traveling device. Reference numeral 8 denotes an elastic member arranged between the support members 4 which returns to an original length on exhausting the pressurized fluid from the elastic contractible body to move the support members toward and away from each other.

However, the traveling device movable in a pipe was intended to be moved along a substantially straight line or a curved line having a large radius of curvature. This traveling device cannot move when it encounters a crossing portion, for example, a crossed branched portion or T-shaped branched portion or a curved portion having a small radius of curvature.

Moreover, even at a crossed portion where two pipes cross at a relatively small angle, it is difficult to bring one of anchoring means 6 into engagement with an inner circumferential surface of the pipe sufficiently. Therefore, reliable traveling of the device could not be guaranteed.

SUMMARY OF THE INVENTION

It is an object of the invention to provide a traveling device movable along an elongated member, which eliminates all the disadvantages of the prior art and which is small-sized and light weight and superior in explosion proofness and is able to move along a curved line having a relatively small radius of curvature.

In order to accomplish the object, the traveling device moving along an elongated member according to the invention comprises support members arranged spaced apart from each other, an elastic contractible body arranged between the support members and expansible radially outwardly to cause contracting force in axial directions, an elastic member causing a force against the contracting force of the elastic contractible body, anchoring means provided on the support members, respectively, and expansible to engage the elongated member when being supplied with a pressurized fluid, and a plurality of control cables each extending through one of the support members and connected with one end to the other support member, thereby enabling the traveling device to move along straight and curved portions of the elongated member by supplying and exhausting the pressurized fluid into and from the elastic contractible body and operating the control cables in response to alternate supply and exhaust of the pressurized fluid into and from the anchoring means.

When the pressurized fluid is alternately supplied and exhausted into and from the elastic contractible body arranged between the support members and the pressurized fluid is alternately supplied and exhausted into and from the anchoring means provided at the support members, the anchoring means alternately engage an inner or outer surface of a pipe as an elongated member. One of the support members disengaged from the surface of the elongated member is attracted by the contracting force of the elastic member and is pushed forward straight in the advancing direction.

Moreover, in response to the movement of the support members by the elastic member, by operating the control cables to restrain the support members associated with the control cable, part of the elastic member associated with the relevant control cables is restrained, but the remaining part of the elastic member is permitted to elongate in returning, so that the traveling device moves along a curved line.

In another aspect of the invention, a traveling device moving along an elongated member according to the invention comprises at least three support members arranged spaced apart from each other, elastic contractible bodies arranged at least two locations between the support members and expansible radially outwardly to cause contracting forces in axial directions, elastic members causing forces against the contracting forces of the elastic contractible bodies, respectively, anchoring means arranged on the support members associated with the elastic contractible bodies, respectively, and expansible to engage the elongated member when being supplied with a pressurized fluid, and control cables each having a cable whose one end is connected to the support member forwardly positioned in an advancing direction, thereby enabling the traveling device to move along straight and curved portions of the elongated member by supplying and exhausting the pressurized fluid into and from the respective elastic contractible body and operating the control cables in response to alternate supply and exhaust of the pressurized fluid into and from the anchoring means The pressurized fluid is alternately supplied and exhausted into and from the elastic contractible bodies arranged between at least three support members, respectively, to cause the elastic contractible body to contract alternately, while in response to the application of the pressurized fluid to the elastic contractible bodies, the pressurized fluid is supplied and exhausted into and from the anchoring means which expand to engage an inner surface of the pipe or contract to disengage from the pipe, thereby enabling the traveling device to move forward or rearward in the pipe.

In moving the traveling device along a portion of a pipe where two pipes perpendicularly intersect or at an acute angle, when the traveling device arrives at such an intersection, control cables each having one end fixed to the support member positioned forwardly are operated to sharply curve the elastic contractible body and the elastic member associated with the support member positioned forwardly, thereby enabling the traveling device to advance along the intersection.

Moreover, the pressurized fluid is exhausted from the respective anchoring means which disengage from the inner surface of the pipe, and control cables and supply and exhaust pipes for the pressurized fluid are retracted, so that the traveling device can be retracted rearwardly. The supply and exhaust of the pressurized fluid into and from the elastic contractible bodies and the anchoring means can be modified in various ways and are not limited to the above explanation.

The invention will be more fully understood by referring to the following detailed specification and claims taken in connection with the appended drawings.

BRIEF DESCRIPTION OF THE DRAWINGS

FIGS. 4a and 4b illustrate support members used in the traveling device according to the invention;

FIGS. 5a-5e are explanatory views for explaining the operation of the traveling device according to the invention;

FIGS. 6a and 6b are partial sectional front and side views illustrating another embodiment of the traveling device according to the invention;

FIG. 7 is an explanatory view for explaining the operation of the device shown in FIGS. 6a and 6b;

FIG. 8a is a view illustrating a further embodiment of the traveling device according to the invention;

FIGS. 8b and 8c are views illustrating the operation of the device shown in FIG. 8a;

FIGS. 10a and 10b are explanatory views for explaining the operation of the traveling device shown in FIG. 8a; and FIG. 11 is a view illustrating a further embodiment of the device according to the invention.

EXPLANATION OF THE PREFERRED EMBODIMENTS

Figure 1:
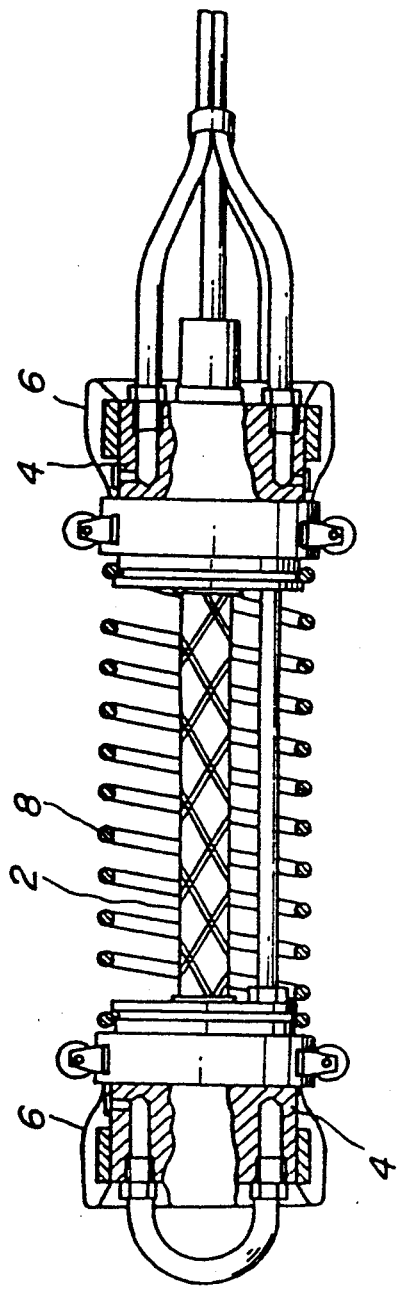
FIG. 1 is a view illustrating a traveling device of the prior art.
Figure 2:
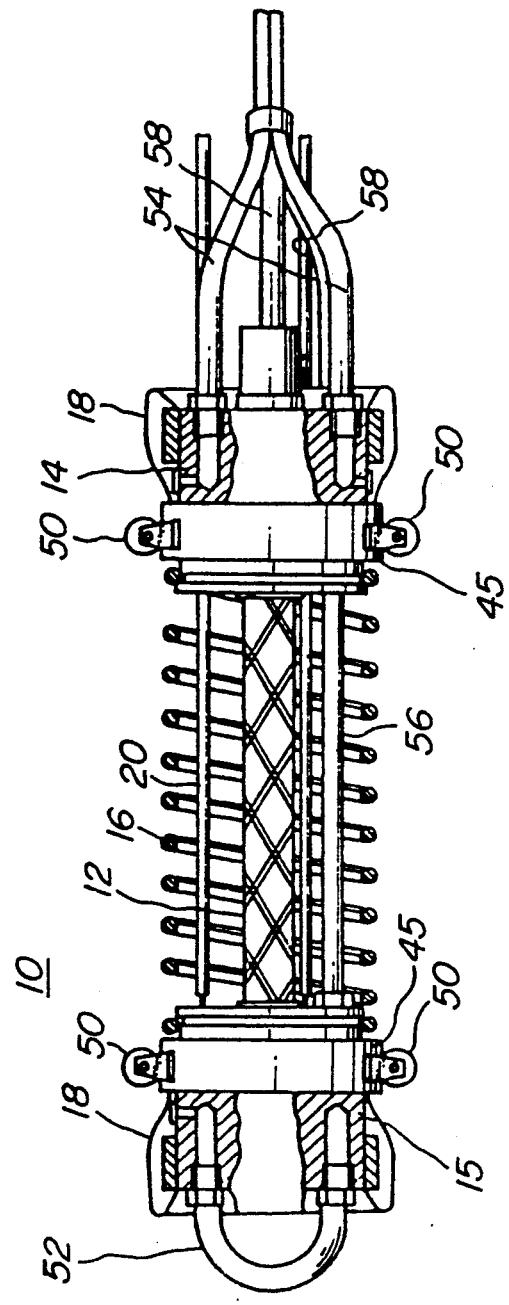
FIG. 2 is a partial sectional front elevation illustrating a traveling device moving along an elongated member.

FIG. 2 illustrates in partial section a traveling device 10 movable along an elongated member according to the invention. The traveling device 10 comprises an elastic contractible body 12, support members 14 and 15 supporting ends of the elastic contractible body 12, a compression spring 16 as an elastic member arranged between the support members 14 and 15, anchoring means 18 fixed to the support members 14 and 15, respectively, and control cables 20. One end of each of the control cables 20 extending through one of the support members 14 is fixed to an end face of the other support member 15 in opposition to the support member 14

Figure 3:
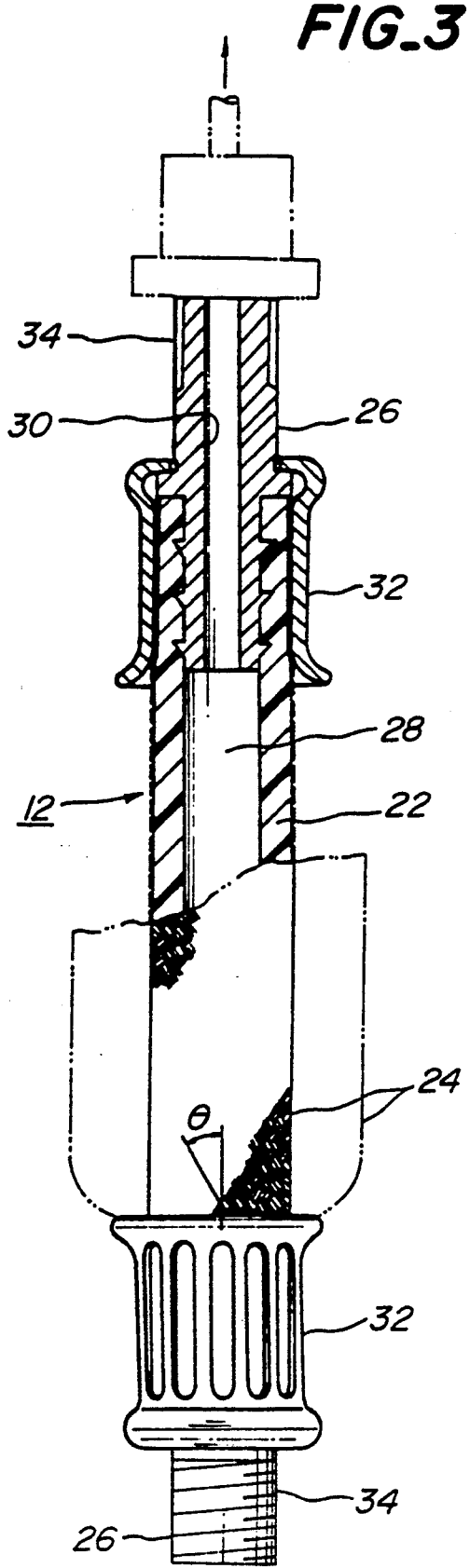
FIG. 3 is a partial sectional view illustrating an elastic contractible body preferably used in the traveling device according to the invention.

As shown in FIG. 3 the elastic contractible member 12 comprises a tubular body 22 made of a rubber or rubber-like elastic material, a reinforcing braided structure 24 covering the tubular body and made of preferably high tension fibers, for example, aromatic polyamide fibers (trade name, KEVLAR), and closure members 26 closing and joining both end openings of the tubular body and the reinforcing braided structure. At least one of the closure members 26 is formed with a connecting aperture 30 communicating with an inner space 28 in the tubular body 22.

The braided structure 24 is constructed so that when the tubular body 22 has expanded to the maximum expanded diameter by supplying the pressurized fluid into the inner space 28 in the tubular body 22, braided angles of the braided structure 24 become the so-called angle of repose (54°44'). Initial braided angles are preferably selected within a range of 10° to 25°. Reference numeral 32 denotes clamp sleeves which in cooperation with the closure members 26, prevent the tubular body 22 and the reinforcing braided structure 24 from being dislodged from the closure members 26.

A pipe line including a three-way valve connected to an operating pressure source (not shown), for example and, air compressor is connected through a suitable fitting (not shown) to the connecting aperture 30 of the elastic contractible body 12. With this arrangement, when compressed air is supplied into the inner space 28 in the tubular body, the elastic contractible body 12 expands radially outwardly but contracts in axial direction. In contrast herewith, when the compressed air is exhausted from the inner space 28 in the elastic contractible body, the elastic contractible body is returned to its original length with the aid of the elastic force of the tubular body 22.

To both the ends of the elastic contractible body 12 are fixed the support members 14 and 15 shown in section in FIGS. 4a and 4b.

In this embodiment, the support member 15 substantially in the form of a column is formed with an internal thread 36 adapted to threadedly engage a screw-thread 34 formed on one of the closure members of the elastic contractible body 12 in order to facilitate fixing with the end of the elastic contractible body 12, and a receiving recess 38 for receiving the clamp sleeve of the elastic contractible body as shown in FIG. 4a. On the other hand, as shown in FIG. 4b, the support member 14 is also in the form of a column having a receiving recess 40 passing through the support member 14 to receive the other clamp sleeve. It is preferable that a fitting shown in phantom lines in FIG. 3 is threadedly engaged on and fixed to the screw-thread 34 formed on the closure member inserted in the support member 14 and extending from the end face thereof, thereby enabling the support member 14 to be integrally mounted onto the elastic contractible body to facilitate the assembly of the actuator.

Moreover, the anchoring means 18 expanding upon supplying the pressurized fluid are arranged on the outer circumferential surfaces of the support members 14 and 15. In making the anchoring means 18, as shown in phantom lines in FIG. 4a or 4b, a tubular member 42 made of a rubber or rubber-like elastic materials is mounted on the outer circumferential surface of the support member 14 or 15 and clamped by a clamp sleeve 44 outwardly provided so that one end of the tubular member 2 is fixed to the support member. Thereafter, the free portion of the tubular member is reversed and a free end thereof is again mounted on the support member 14 or 15 and fixed thereto by another clamp sleeve 45.

Each of the support members 14 and 15 is formed with a supply and exhaust port 46 or 47 for supplying or exhausting the pressurized fluid into or from the inner space of the anchoring means 18. In this embodiment, two supply and exhaust ports are formed in each of the support members in a manner diametrically opposed in order to supply or exhaust the pressurized fluid into or from the anchoring means 18 in a relatively short time. The number and the location of the ports 46 and 47 may be increased or decreased as the case may be.

In this embodiment, the anchoring means are tubular members made of a rubber or rubber-like material. They may be tubular members provided on outer surfaces with reinforcing layers or covers superior in flexibility without restraining movements of the tubular members upon expanding in consideration of repeated expansions and abutment against inner walls of a pipe. Moreover, other tubular members may of course be used which include reinforcing cord layers extending in parallel with axial directions and embedded in the tubular members.

The elastic member 16 is arranged between the support members 14 and 15 s that the support members 14 and 15 are forced away from each other when the presurized fluid is exhausted from the elastic contractible body 12. A compression spring 16 is used as the elastic member in this embodiment. In this embodiment, moreover, the support members are formed with rims 48 and 49 at their ends in opposition to each other in order to facilitate mounting the compression spring on the support members.

A plurality of control cables 20 are provided to extend through the support member 14 in its axial direction and fixed with one end to the other support member 15. The cables 20 are preferably arranged equally spaced apart from each other in a circumference of the support member. Each of the control cables 20 comprises a cable and an outer casing for guiding the cable therein. The cable arranged in the outer casing can smoothly transmit forces required for operating the device.

In the embodiment, the clamp sleeves constituting the anchoring means 18 are provided with rolling means, for example, rollers 50 rolling on the inner surface of a pipe in order to assure the smooth movement of the device in the pipe as shown in FIG. 2.

Moreover, an outer diameter of the traveling device including the rolling means is smaller than an outer diameter of the anchoring means expanded on supplying with the pressurized fluid and an inner diameter of a pipe, but larger than an outer diameter of the device including the anchoring means 18 contracted on exhausting the pressurized fluid. The number and the location of the rolling means are not limited to this embodiment, but may be selected according to a specification of the traveling device.

Figure 5E:
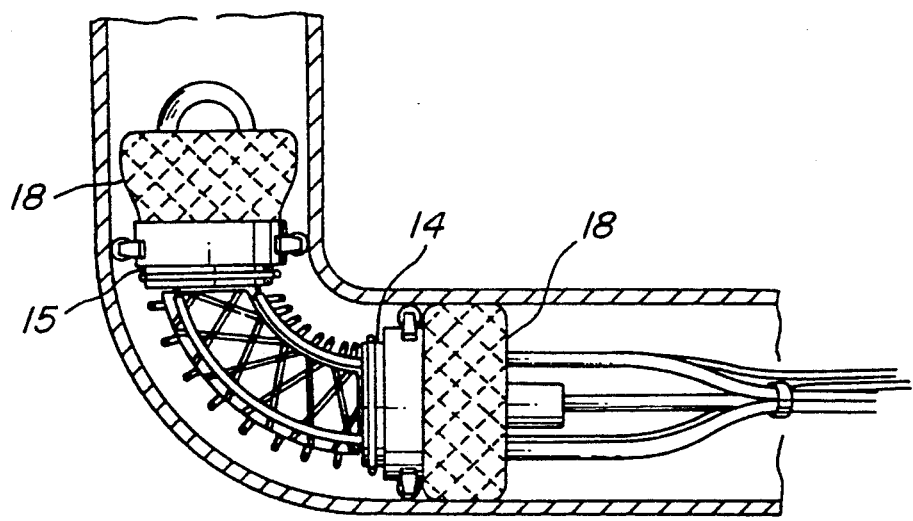

The operation of the traveling device according to the invention will be explained by referring to FIGS. 5a–5e. FIG. 5a illustrates a traveling device arranged in a pipe in which the device moves. The ports 46 formed in the support member 15 are connected through a connecting tube 52 to each other, while the ports 47 formed in the other support member 14 are connected to support and exhaust pipes 54 including control valve means, for example, three-way values and connected to an operating pressure source. In the same manner, to one of the supply and exhaust ports 46 of the support member 15 is connected one end of the connecting tube 56 spaces from and extending in parallel with the elastic contractible member, while the other end of a connecting tube 56 is connected to a through-aperture (not shown) formed in the support member 14. To the other end of the through-aperture is connected a supply and exhaust pipe 58 including a thee-way valve.

It is assumed that a direction shown by an arrow A is the direction in which the device is to be moved. First, a pressurized fluid is supplied into the anchoring means 18 positioned forwardly through the supply and exhaust pipe 56 to expand the anchoring means 18 so that the anchoring means 18 and hence the support member 15 positioned forwardly are fixed to the pipe as shown in FIG. 5b.

Then, the pressurized fluid is supplied into the elastic contractible body 12 through a supply and exhaust pipe 60 including valve means connected to the operating pressure source, so that the elastic contractible body 12 expands radially outwardly but contracts in axial directions.

The contracting force caused in the elastic contractible body 12 depends upon the pressure of the pressurized fluid. By suitably selecting the pressure of the fluid, the compression spring 16 as the elastic member is compressed. Therefore, when the pressurized fluid at a suitable pressure is supplied into the elastic contractible body, the support member 14 advances forwardly compressing the compression spring 16 (FIG. 5b).

At this moment, the anchoring means 18 positioned rearwardly associated with the support member 14 is expanded by supplying the pressurized fluid thereinto so that the anchoring means 18 is also engage the inner wall of the pipe and fixed thereto as shown in FIG. 5c.

The pressurized fluid is then exhausted from the anchoring means 18 forwardly positioned through the supply and exhaust pipe 54 to contract the anchoring means 18. Moreover, the pressurized fluid is exhausted from the elastic contractible body 12 through the supply and exhaust pipe 58 to reduce the contracting force. As a result, the support member 18 forwardly positioned is moved forwardly with the aid of the elastic returning force stored in the compression spring 16 as shown in FIG. 5d.

Thus, the traveling device can be advanced straight along the pipe by alternately supplying and exhausting the pressurized fluid into and from the elastic contractible body and the anchoring means in the above sequence.

Moreover, the traveling device can be moved along a pipe having a sharply curved portion in the following manner. It is effected to exhaust the pressurized fluid from the inner space of the elastic contractible body 12 under the condition that the support member 14 is fixed to the inner wall of the pipe by supplying and exhausting the pressurized fluid into and from the anchoring means 18 associated with the support member 14 in the same manner as shown in FIG. 5d. In this case, however, when the pressurized fluid is exhausted from the elastic contractible body 12, tensile forces are applied to the control cables positioned on an inner side of the curved portion, while no tensile forces are applied to the remaining control cables.

As a result, the traveling device is sharply curved when the pressurized fluid is exhausted from the inner space of the elastic contractible body 12 so that the traveling device can move sufficiently along such a sharply curved portion of the pipe. This is schematically shown in FIG. 5e. It should be noticed that such a sharply curving function of the device can be effected only by using an elastic contractible body having a flexible construction itself, but could not be accomplished by devices of the prior art.

Moreover, the operation of the respective control cables 20 can be carried out in a manner to meet a moved distance of the traveling device and images from visual means such as television camera or the like provided on the traveling device. Although the control cables can be manually operated, they may be operated by electric motors or hydraulic cylinders, if required. When such motors or cylinders may be provided outwardly of the pipe, the traveling device can be used in an explosive atmosphere.

FIGS. 6a and 6b illustrate a preferable embodiment of the traveling device according to the invention. This traveling device can be moved along an outer surface of a pipe shown in phantom lines in FIG. 6a. Onto support blocks 14a and 15a are arranged anchoring means 18 supporting both ends of an elastic contractible body 12 and expansible on supplying a pressurized fluid to engage the outer surface of the pipe. The support blocks 14a and 15a are fixed through clamp sleeves 45 to support frames 14b and 15b. These support blocks and support frames cooperate with each other to perform the same function as in the embodiment shown in FIG. 2.

The support frames 14b and 15b are in the form of a pair of half rings to form a circular ring surrounding the pipe along which the traveling device moves and pivotally connected to each other at a hinge 60. The circular ring formed by the support frames 14b and 15b has an inner diameter such that the anchoring means expanded by supplying the pressurized fluid thereinto engage the outer surface of the pipe. On the support blocks 14a and 15a are substantially similar in construction to those of the support members shown in FIGS. 4a and 4b in order to facilitate arranging the anchoring means and the elastic contractible body.

In the embodiment, moreover, the support frames 14b and 15b are provided with a plurality of brackets 62 fixed thereto, and a plurality of U-shaped restraining plates 64 are fixed to inner surfaces of the brackets 62, respectively, thereby limiting expansion of the anchoring means 18 away from the pipe along which the traveling device moves to ensure the firm engagement between the expanded anchoring means and the outer surface of the pipe.

Control cables 20 extend through the support frame 14b and one end of the cables 20 are fixed to an opposed end face of the other support frame 15b. However, one ends of the cables 20 may of course be fixed to an opposed end face of the support block 15a.

In order to ensure the smooth movement of the device along the pipe, rollers 50 are arranged on inner surfaces of the support frames and circumferentially spaced apart equal distances. Elastic contractible bodies 12 and compression springs 16 as elastic members are arranged between the support blocks 14a and 15b in the same manner as in the embodiment shown in FIG. 2.

The operation of the traveling device of the embodiment will be explained hereinafter. It is assumed that suitable supply and exhaust pipes including three-way valves connected to an operating pressure source are connected to the elastic contractible bodies and the anchoring means to supply and exhaust the pressurized fluid thereinto and therefrom.

When the pressurized fluid is supplied into the anchoring means 18 provided on the support block 15a to expand the anchoring means 18 so as to engage the outer surface of the pipe. The pressurized fluid is then supplied into the elastic contractible bodies 12 so that the bodies 12 contract to move the support blocks 14a forwardly in the advancing direction.

At the moment, the pressurized fluid is supplied into the anchoring means 18 provided on the support blocks 14a so that the anchoring means expand to engage the outer surface of the pipe, while the pressurized fluid is exhausted from the expanded anchoring means provided on the support block 14b so that the anchoring means contract, with the result that the compression springs as the elastic members compressed in axial directions owing to the contracting movements of the elastic contractible bodies elongate by their returning forces to push forward the support blocks 15a.

The straight advancing movement of the device is effected by repeatedly supplying and exhausting the pressurized fluid in the sequence above described.

On the other hand, when the traveling device is moved along a curved pipe shown in phantom lines in FIG. 7. The control cables positioned on the inner side of the curved portion of the pipe are operated in response to the exhausting of the pressurized fluid from the elastic contractible bodies to restrain the advancing movements of the support blocks and support frames due to owing to the compression springs as elastic members. The support blocks and the support frames not restrained by the control cables are pushed forward by the associated elastic contractible bodies so that the device is moved along the curved portion of the pipe.

The invention is not limited to the above embodiments and various changes and modifications can be made within the scope of the invention. For example, by changing shapes of the support members, the device can be moved in and out of pipes having various shapes therealong.

As can be seen from the above explanation, the traveling device according to the invention utilizes the elastic contractible bodies which are light weight and small-sized in comparison with other actuators and expand radially outwardly to cause large contracting force in axial directions when supplying a pressurized fluid. Therefore, the invention can provide a traveling device abundant in freedom which is reduced in size and weight and applicable in an explosive atmosphere without any risk of occurrence of spark and heating and is capable of moving along sharply curved elongated members by operating the control cables.

Moreover, when compressed air is used as an operating fluid, even if the device is damaged, there is no risk of contamination of operating environment.

A further embodiment of the invention will be explained, wherein there are a plurality of support members. In this case, however, a device comprises three support members between which elastic contractible bodies are arranged as explained referring to FIGS. 8a-8c.

FIG. 8a illustrates the traveling device 110 of this embodiment arranged in a branched pipe. The device comprises elastic contractible bodies 112 and 113, support members 114, 115 and 116 supporting ends of the bodies, compression springs 118 and 119 as elastic members arranged between the support members, anchoring means 121, 122 and 123 fixed to the support members, respectively, and control cables 124. Each of the control cables 124 extends through the support members 15 and 16 and one end of the cable is fixed to an end face of the support member 14 positioned forwardly in an advancing direction shown by an arrow A.

Figure 9:
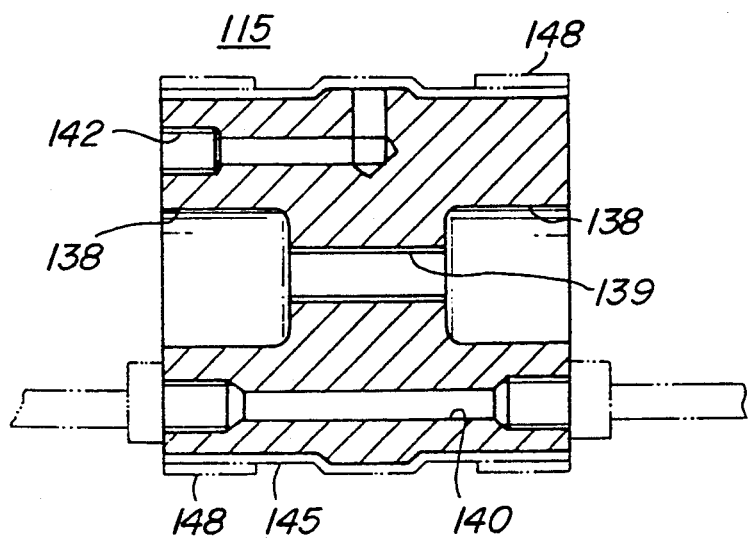
FIG. 9 is a sectional view illustrating a support member used between the two elastic contractible bodies.

The support members 114, 115 and 116 are fixed to ends of the elastic contractible body. The support members 114 and 116 are substantially the same as those shown in FIGS. 4a and 4b. The support member 115 is shown in FIG. 9.

The ends of the opposite elastic contractible bodies 112 and 113 are connected to each other by means of the support member 115. As shown in FIG. 9, the support member 115 is formed with receiving recesses 138 spaced apart from each other for receiving ends of the elastic contractible bodies 112 and 113, an internal thread portion 139 coaxially opening in the recesses 138 and threadedly engage on screw threads 139 of the elastic contractible bodies, a through-aperture 140 adapted to be connected to a supply and exhaust pipe for supplying and exhausting the pressurized fluid into and from the elastic contractible body positioned forwardly in the advancing direction, through-apertures (not shown) through which control cables extend, and a communicating aperture 142 opening at an outer surface of the support member 115. These support members 14–16 are preferably made of a light and rigid material in consideration of the advantageous light weight of the elastic contractible bodies. However, they may of course be made of a metal.

The anchoring means provided on the support members 114 and 116 are substantially the same as those shown in FIGS. 4a and 4b.

The anchoring means 122 provided on the support member 115 is formed by a tubular member 145 made of a rubber or rubber-like elastic material applied to an outer circumference of the support member 115. Both ends of the tubular member 145 are clamped to the support member 115 by clamp sleeves 148 so that the communicating aperture opens a space defined by the tubular member 145 and the support member 115. The number and the location of the communicating aperture may be increased or decreased if required.

Compression springs 118 and 119 as elastic members are arranged between the support members 114, 115 and 116 in the same manner as in the previous embodiment.

Each of control cables extends through the support members 16 and 15 in their axial direction and one end of the control cable is fixed to an end face of the support member 14 positioned forwardly in the advancing direction.

Rollers 150 are provided to ensure the smooth movement of the device.

In applying the pressurized fluid, lengths of the respective elastic contractible bodies contracted about 20% in their axial directions are set larger than an inner diameter d of a pipe intersecting the pipe in which the device advances, thereby ensuring the smooth movement of the device.

The operation of the traveling device of this embodiment will be explained hereinafter.

FIG. 8a illustrates the traveling device 110 arranged in a pipe in which the device 110 moves in a direction shown by an arrow A. Reference numeral 52 denotes supply and exhaust pipes including valve means, for example, three-way valves and connected to an operating pressure source for supplying and exhausting a pressurized fluid into the elastic contractible bodies 112 and 113 and the anchoring means 121–123.

When it is required to continuously advance or retract the traveling device across an intersecting or branched portion in a pipe, the following three steps may be repeated in successive manner.

In the first step, the pressurized fluid is alternately supplied and exhausted into and from the anchoring means 121 and 123, while at the same time the pressurized fluid is supplied and exhausted into and from the elastic contractible bodies 112 and 113. The pressurized fluid is not applied to the anchoring means 122.

In practice, the pressurized fluid is supplied into the anchoring means 121 which expands to engage an inner surface of the pipe, whereas the pressurized fluid is exhausted from the anchoring means 123 or the pressurized fluid is not supplied into the anchoring means 123 and the pressurized fluid is applied to both the elastic contractible bodies 112 and 113 so that both the elastic bodies contract to move the support member 116 toward the anchoring means 121. In this case, the elastic members 118 and 119 are compressed as a distance between the anchoring means 121 and 123 and hence a distance between the support members 114 and 116 are shortened.

Then, the pressurized fluid is supplied into the anchoring means 123 positioned rearwardly in the advancing direction so that the anchoring means 123 expand to engage the inner surface of the pipe. Thereafter, the pressurized fluid is exhausted from the anchoring means 121 forward positioned so that the anchoring means 121 is disengaged from the inner surface of the pipe, while the pressurized fluid is exhausted from the elastic contractible bodies. The support member 114 associated with the anchoring means 121 is pushed forward by the returning extension of the elastic members 118 and 119 and the elastic contractible bodies. It should be noticed that the moved distance of the support member 114 is a sum of the returning distances of the elastic contractible bodies 118 and 119 so that the distance moved of the support member 114 is about twice that in the case of a single elastic contractible body.

The pressurized fluid is then supplied into the anchoring means 121 associated with the advanced support member 114 so that the anchoring means 121 expands to engage the inner surface of the pipe, while the pressurized fluid is exhausted from the anchoring means 123 so that the anchoring means 123 is disengaged from the inner surface of the pipe. The first step is completed in this manner which is schematically illustrated in FIG. 8b.

In second step following to the first step, the pressurized fluid is supplied into the anchoring means 121 and 122 and the elastic contractible body 112.

On the termination of the first step, the anchoring means 121 is under the expanded condition with the pressurized fluid. Therefore, when the pressurized fluid is supplied into the elastic contractible body 112 so that the elastic contractible body 112 contracts against the elastic member 118. As a result, the support member 115 associated with the anchoring means 122 devoid of the pressurized fluid and the support member 116 associated with the anchoring means 123 are moved forward in the advancing direction.

The pressurized fluid is then supplied into the anchoring means 122 which expands to engage the inner surface of the pipe, while the pressurized fluid is exhausted from the elastic contractible body 112. As a result, the support member 114 associated with the anchoring means 121 is moved forward by the returning extension of the elastic contractible body 112 and the elastic member 118. The second step is completed in this manner, which is schematically shown in FIG. 8c.

In third step following to the second step, the pressurized fluid is supplied into the anchoring means 122 and 123 and the elastic contractible body 113.

After completion of the second step, the pressurized fluid is supplied into the elastic contractible body 113 which contracts against the elastic member 119. As a result, the support member 116 associated with the anchoring means 123 is moved forward in the advancing direction as the anchoring means 122 engages the inner surface of the pipe.

Then, the pressurized fluid is supplied into the anchoring means 123 which expands to engage the inner surface of the pipe, while the pressurized fluid is exhausted from the anchoring means 122 which is disengaged from the inner surface of the pipe and the pressurized fluid is exhausted from the elastic contractible body 113. As a result, the support member 115 associated with the anchoring means 122 and hence the support member 114 associated with the anchoring means 121 are moved forward by the returning extension of the elastic contractible body 113 and the elastic member 119. The third step is completed in this manner, which is shown in FIG. 8a.

Figure 10B:
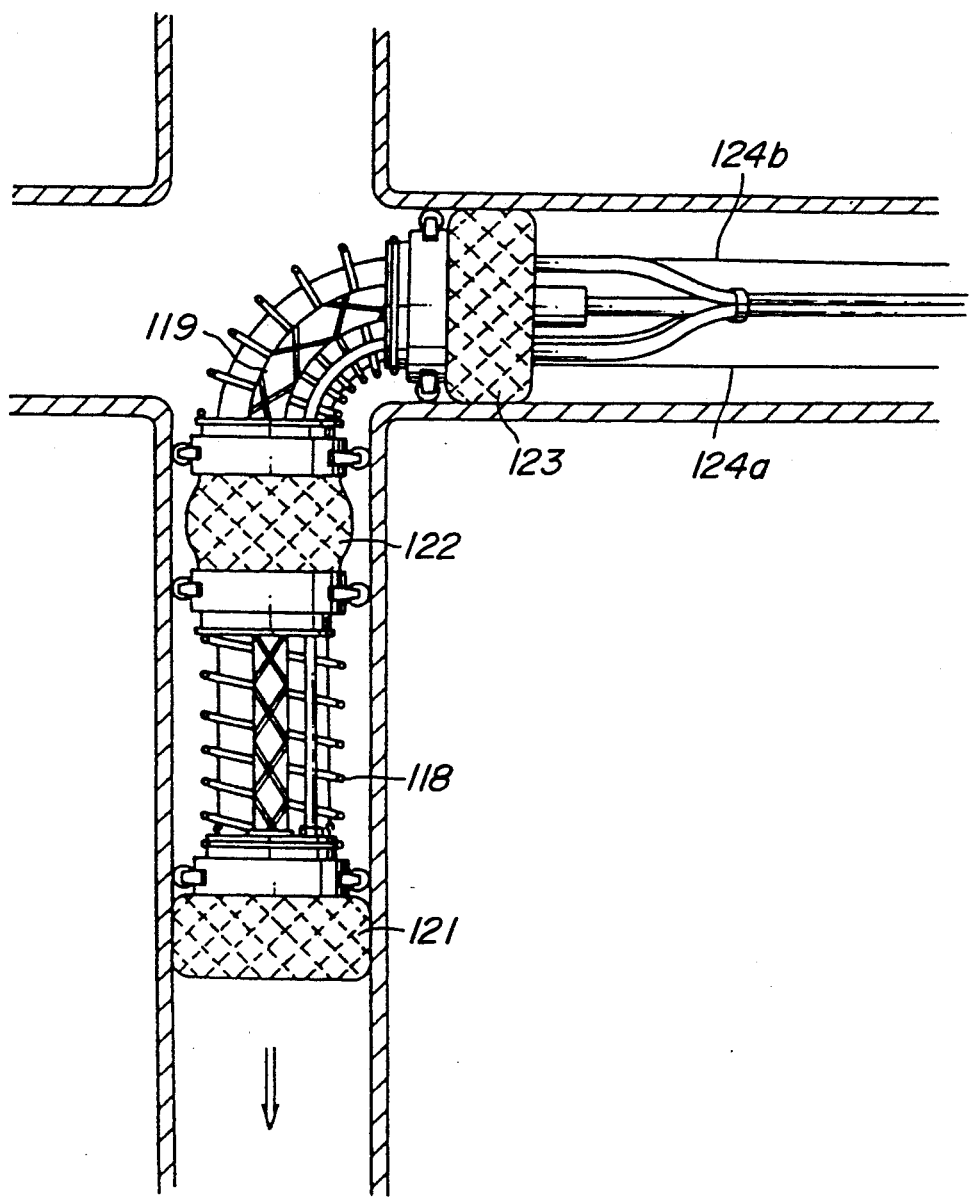

If the traveling device is moved along a sharply curved portion or a perpendicularly intersecting pipe, it is effected by suitably operating the control cables 124. It is illustrated in FIGS. 10a and 10b.

FIG. 10a illustrates the traveling device advancing in a curved line caused by the anchoring means 122 and 123 and the elastic contractible body 113 associated therewith. In response to the forward movements of the support members 115 and 114 associated with the anchoring means 122 and 121 by the returning extension of the elastic member 119, the control cables 124a positioned on an inner side of the curved position are restrained from extending, while the control cables 124b positioned on an outer side of the curved position are extended. The advancing direction of the traveling device 110 is changed through about 90°.

By effecting the first to third steps repeatedly, the traveling device can be advanced along requisite passages. It may of course be possible to select any of the first to third steps and do each of the steps separately.

The traveling device has been explained driven by the sequence control in the above explanation. However, the following arrangement is also possible. Namely, as shown in FIG. 11, one ends of flexible support pieces are fixed to clamp sleeves forming anchoring means 121-123 in cooperation with the support members 114-116, and to the other ends of the flexible support pieces are mounted rollers 150 as rolling means. Switches 154 for sensing deformations of the support pieces are provided to detect engagement of the rollers with the inner surface of the pipe. Control cables may be operated or the pressurized fluid may be supplied and/or exhausted on the basis of determination of the elastic contractible bodies and the anchoring means to be operated according to signals from the switches.

The present invention is not limited to the above embodiments. To a support member positioned forward in the advancing direction may be provided a camera for providing visual information. On the basis of the image information through the camera, the advancing direction of the device may be adjusted or the inside of the pipe may be inspected. The number of the support members and the anchoring means may of course be increased to improve reliability concerning elimination of any trouble.

As can be seen from the above explanation, the invention can provide a traveling device moving along an elongated member, which is able to move along a curved portion having a small radius of curvature and an intersecting portion at 90° or an acute angle, keeping the merit of small-sized and light weight and superior in explosion-proofness.

What is claimed is:

1. A traveling device for moving along an elongated member comprising; a pair of support members spaced apart from each other, an elastic contractible body arranged between the support members and expansible radially outwardly to cause contacting force in axial directions, an elastic member causing a force against the contracting force of the elastic contractible body, anchoring means provided on the support members, respectively, and expansible to engage the elongated member, means for supplying said anchoring means with a pressurized fluid and for exhausting said pressurizing fluid, and a plurality of control cables each extending through one of the support members and means at one end to connect said control cables to the other support member, wherein the traveling device moves along straight and curved portions of the elongated member by supplying and exhausting the pressurized fluid into and from the elastic contractible body and applying forces to the control cables in response to alternate supply and exhaust of the pressurized fluid into and from the anchoring means.

2. A traveling device as set forth in claim 1, wherein at least one of the support members is formed with an internal thread to engage a screw thread formed on a closure member of the elastic contractible body.

3. A traveling device as set forth in claim 1, wherein each of the support members is formed with a receiving recess for receiving a clamp sleeve of the elastic contractible body.

4. A traveling device as set forth in claim 1, wherein each of the anchoring means is a tubular member made of an elastic material and is fixed to one of the support members with both ends in a manner that after one end has been fixed to the support member, a free portion of the tubular member is reversed and a free end is fixed to the support member.

5. A traveling device as set forth in claim 1, wherein said elastic member is a compression spring.

6. A traveling device as set forth in claim 5, wherein said support members are formed with rims at their ends in opposition to each other in order to facilitate mounting the compression spring on the support members.

7. A traveling device as set forth in claim 1, wherein each of the control cables comprises a cable and an outer casing for guiding the cable therein.

8. A traveling device as set forth in claim 1, wherein the device comprises rolling means to assist in moving the device.

9. A traveling device as set forth in claim 1, wherein said device further comprises support frames in the form of a pair of half rings to form a circular ring surrounding a pipe along which the device moves and pivotally connected to each other at a hinge, and support blocks fixed to the support frames to hold one of elastic contractible bodies to the support frames.

10. A traveling device as set forth in claim 9, wherein said support frames are provided with a plurality of brackets fixed thereto, and a plurality of U-shaped restraining plates fixed to inner surfaces of the brackets, respectively, thereby limiting expansion of the anchoring means away from the elongated member along which the device means.

11. A traveling device as set forth in claim 9, wherein control cables extend through the support frame and one ends of the cables are fixed to an opposed end face of the other support frame.

12. A traveling device as set forth in claim 9, wherein rollers are arranged on inner surfaces of the support frames and circumferentially spaced apart equal distances.

13. A traveling device for moving along an elongated member comprising; at least three support members arranged spaced apart from each other, elastic contractible bodies arranged at least two location between the support members and expansible radially outwardly to cause contracting forces in axial directions, elastic members causing forces against the contracting forces of the elastic contractible bodies, respectively, anchoring means arranged on the support members associated with the elastic contractible bodies, respectively, and expansible to engage the elongated member, means for supplying said anchoring means when being supplied with a pressurized fluid and for exhausting said pressurizing fluid, and control cables each having a cable with an end connected to the support member forwardly positioned in an advancing direction wherein the traveling device moves along straight and curved portions of the elongated member by supplying and exhausting the pressurized fluid into and from the respective elastic contractible body and applying forces to the control cables in response to alternate supply and exhaust of the pressurized fluid into and from the anchoring means.

14. A traveling device as set forth in claim 13, wherein the support member connecting two elastic contractible bodies is formed with receiving recesses spaced apart from each other for receiving ends of the elastic contractible bodies on both sides thereof, an internal thread portion coaxially opening in the recesses and threadedly engage on screw threads of the elastic contractible bodies, a through-aperture to be connected to a supply and exhaust pipe for supplying and exhausting the pressurized fluid into and from the elastic contractible body positioned forwardly in the advancing direction, and a communicating aperture opening at an outer surface of the support member.

15. A traveling device as set forth in claim 13, wherein the anchoring means provided on the support member between the two elastic contractible bodies is formed by a tubular member made of an elastic material whose both ends are clamped to the support member.

* * * * *

UNITED STATES PATENT AND TRADEMARK OFFICE
CERTIFICATE OF CORRECTION

PATENT NO. : 5,080,020
DATED : January 14, 1992
INVENTOR(S) : Koichi Negishi

It is certified that error appears in the above-indentified patent and that said Letters Patent is hereby corrected as shown below:

On the title page: Item [73] Assignee

The Assignee: "Nihon Kohden Corporation" should be --Bridgestone Corporation-- as listed on the original Assignment filed July 13, 1990 and recorded on January 9, 1991 at Reel 5557, Frame 0822.

Signed and Sealed this

Twenty-sixth Day of October, 1993

*Attest:*

BRUCE LEHMAN

*Attesting Officer*   Commissioner of Patents and Trademarks